United States Patent Office
3,677,796
Patented July 18, 1972

3,677,796
PROTECTIVE COATING TO INHIBIT OXIDATION AND/OR CARBURIZATION OF METALLIC SURFACES
Roland T. Girard, Scotia, and George A. Rice, Schenectady, N.Y., assignors to General Electric Company
No Drawing. Continuation of application Ser. No. 663,966, Aug. 29, 1967. This application May 27, 1970, Ser. No. 41,118
Int. Cl. B44d 1/16
U.S. Cl. 117—70 A    5 Claims

ABSTRACT OF THE DISCLOSURE

Oxidation and carburization of steel surfaces heated to elevated temperatures above 600° C. are inhibited by a protective coating containing at least 10% fusible materials to shield, upon softening, the steel surface from deteriorating agents and at least 20% sacrificial metal particles to react with carbonaceous materials penetrating the protective shield formed by the softened fusible materials. The protective coating preferably is applied in dual layers with the base coat for a machined steel surface generally comprising a suspension of iron particles and a soluble silicate binder to adhere a spray application of the base coat to the machined steel surface. After the base coat has partially dried, a sealer coat containing suspensions of nepheline syenite and glass particles in water and a sodium silicate binder is sprayed atop the base coat to serve, upon softening of either the nepheline syenite or glass particles, as a barrier layer to shield the steel surface from oxygen and carbon-bearing materials. When the protected surface is to be worked in a damp environment, a waterproofing coat of 25% $SiO_2$ content hydrolyzed ethyl silicate solution is applied atop the sealer coat. A mixture of the base coat and the sealer coat provides protection against pitting of a steel surface located in a dry environment with a single application of the protective coating while the incorporation of a suitable carbonate, hydroxide, oxide or fluoride into either the sealer coat or the mixture of the base coat and the sealer coat eliminates the need for a separate waterproofing coat when the alloy is heat worked in a damp environment.

---

This is a continuation of application Ser. No. 663,966, filed Aug. 29, 1967, now abandoned.

This invention relates to a protective coating to inhibit oxidation and/or carburization of metallic surfaces during high temperature working and more particularly to a protective coating characterized by a sacrificial metal and a sealant to shield the metallic surface from undesired contamination.

In casting diaphragm partition blades for steam turbines, such as by the method disclosed in U.S. Pat. 2,097,314, issued to L. B. Wales on Oct. 26, 1937, the center sections of a plurality of steel turbine blades are secured in position within a sand mold and molten metal at a temperature of approximately 2700° F. is poured into arcual cavities formed within the sand mold to fuse with the exposed extremities of the turbine blades protruding into the arcual cavities. Heat from the molten metal is conducted to the center sections of the turbine blades thereby raising the temperature of the center sections of the blades to approximately 1200° C. at which temperature the iron in the blades reacts with either oxygen or carbon-bearing materials in the adjacent sand to pit or carburize the blades, respectively. Thus upon removal of the blades from the sand mold after cooling, costly machining is required to conform the cast blades with the minimum tolerances required for aeroydnamic stability and structural soundness.

Although a number of protective compositions have been designed for application to metals to inhibit oxidation of the metal during heat working, protective compositions heretofore generally have not been directed to the problem of carburization. However, in casting of turbine blades set within sand molds, carbon-bearing materials often are present in the sand and brittleness in the turbine blades produced by carburization of the the blades is an acute problem. The problem of carburization is increased immensely when the turbine blades are positioned within relatively highly carbonaceous "no-bake" sand, e.g. sand which does not require heating to set. Furthermore because the reactive range of the blades with oxygen and carbon-bearing materials extends over a substantial portion of the cooling cycle of the turbine blades, e.g. from about 1300° C. to 600° C., the protective coating for the turbine blades must be effective over a wide temperature range above 600° C.

It is therefore an object of this invention to provide a protective coating to inhibit carburization of metals subject to workings at elevated temperatures.

It is also an object of this invention to provide a dual protective coating to inhibit both oxidation and carburization of metals subject to workings at temperatures above 600° C.

These and other objects of this invention generally are accomplished in a protective coating by the inclusion of sacrificial metal particles of a material having a reactivity with carbon and carbon-bearing materials at least equal to the reactivity of the protected metal with carbon and carbon-bearing materials. The coating thus may include a fusible material comprising at least 10% by weight of the solids forming the protective coating and having a softening point above at least 500° C., particles of a material having a reactivity with the carbon and carbon-bearing materials equal to or greater than the reactivity of the protected metal with carbon and carbon-bearing materials, and a bonding agent intermingled with the reactive particles and the fusible material to the metal surface to be protected.

The protective coating preferably is applied in a two-step process with the initially applied base coat including a bonding agent and particles of a material having a reactivity with carbon or carbon-bearing materials at least equal to the reactivity of the protected metal with carbon and carbon-bearing materials. After the base coat has been at least partially dried, a sealing coat comprising a fusible material and a bonding agent is applied atop the base coat. The fusible material in the sealing coat, upon softening, functions as a physical barrier to both carbon and carbon-bearing materials while the particles of the reactive material in the base coat function as sacrificial agents to react with carbon-bearing materials penetrating the outer sealing coat.

The protective coating of this invention can be better understood from the following specific example wherein the coating is used to protect a finished iron-chromium alloy surface, e.g. a turbine blade or a machine-tooled surface. After the surface of the alloy is thoroughly cleaned and dried, a base coat in the form of a suspension including sacrificial metal particles, water, a suspending agent, and a binder is applied by conventional air atomized paint spray equipment. The sacrificial metal employed preferably is a combination of 200 mesh and 100 mesh iron particles which were stirred into the base coat after the water, a clay suspending agent, and a sodium silicate binder were ball milled for 15 minutes. The mixture of 200 mesh and 100 mesh iron particles generally is a comprise necessitated because iron particles of small diameter, e.g. 200 mesh, tend to produce cracks in the base coat of the protective coating upon drying while iron particles of relatively large dimensions, e.g. 100 mesh, result in an uneven distribution of the iron particles adjacent the surface of the protected alloy. The iron particles should form at least 20% by weight of the solids in the protective coating to adequately protect the alloy surface against carburization.

Although iron was chosen as the sacrificial agent for reasons of economy, any other material, e.g. chromium, molybdenum, zirconium or titanium, having a reactivity with carbonaceous materials at least equal to the reactivity of the alloy to be protected with carbon can be utilized. Preferably the sacrificial particles are a metal chosen from the group of metals forming the alloy to prevent a reaction between the base coat and the hot worked alloy deleterious to the characteristic properties of the alloy.

The suspending agent employed to form the emulsion of the iron particles within the water preferably is a purified, highly pulverized and air floated ball clay, e.g. $Al_2O_3 \cdot 2SiO_2$. Because the base coat is applied directly to the alloy surface, the desirable long suspending characteristics in the clay must be compromised by the necessity for a low organic content in the base coat to avoid contamination of the alloy surface during the heat working of the alloy. An organic content in the clay of 5% or less can be tolerated without undue contamination of the alloy by impurities in the protective coating.

The binder employed in the base coat is a sodium silicate having a relatively high viscosity, e.g. 1700, with the quantity of sodium silicate preferably being approximately equal to the quantity of distilled water employed in the base coat to assure the application of a 3 to 4 mil thick coating without excessive running of the coating material. Because of the high wastage associated with air spraying of the base coat, an inexpensive filler material such as flint may be added to the base coat to reduce the cost per unit volume of the base coat. The quantity of filler material added generally is dependent upon such factors as the thickness desired for the base coat and the wastage encountered during the application of the base coat. With very thin base coats, e.g. less than 2 mils, or when low wastage methods are employed for applying the base coat to the alloy to be protected, almost no filler is added to the base coat.

After the base coat has been applied to completely cover the alloy surface to be protected and only partially dried, a sealer coat including fusible materials, water, a suspending agent, and a binder is applied atop the base coat. Unless the sealer coat is applied to the base coat while the base coat is still damp, voids tend to form in the base coat at the locations of the evaporated water particles. When the sealer coat then is applied over a void, air trapped in the void tends to blister the sealer coat as the liquid sealer coat penetrates into the void to displace the air.

The fusible materials in the sealer coat preferably are two glasses having softening temperatures of approximately 575° C. and 800° C., respectively, and a synthetic fusible material such as nepheline syenite having a softening temperature of approximately 950° C. As the fusible materials soften during subsequent heat working of the alloy, a gas impervious shield is placed around the protected alloy to block deteriorative gases from attacking the alloy. Similarly, the sealer coat serves as a barrier to isolate deteriorative solids in the surrounding sand from contact with the alloy surface. Because the fusible materials generally are effective sealants over a temperature range extending from the initial softening temperature of the fusible materials to approximately 300° C. above the initial softening temperature of the material, the high melting temperature of nepheline syenite extends the effective temperature range of the sealer coat approximately 150° C. above the effective range of a sealer coat having only the glasses as the fusible materials.

Because the sealer coat is not in direct contact with the alloy to be protected, relatively impure volcanic ash clay having superior suspending characteristics to the ball clay employed in the base coat is utilized as the suspending agent for the sealer coat. Thus a longer suspension of the fusible particles within the sealer coat is assured to inhibit the formation of areas of insufficient fusible particle distribution through which areas oxygen and carbon-bearing materials can pass. Fusible materials comprise at least a minimum of 25% by weight of the solids forming the sealer coat with the ratio of glass to volcanic ash clay in the sealer coat preferably being in the range of 8 to 1.

Sodium silicate is added to the sealer coat as the binding agent to secure the sealer coat to the base coat. However, because the base coat is more porous than the machined surface of the alloy, a low viscosity sodium silicate, e.g. a sodium silicate having a viscosity of approximately 220 centipoises, serves to secure the sealer coat to the base coat. When the sealer is used to protect turbine blades which are subjected to the pounding of said proximate to the blades during fabrication, the binder must possess adequate compressive strength, tensile strength and adhesion for preservation of the integrity of the coating prior to the initial heat melting of the fusible materials. A 3 mil thick sealer coat containing 17.4% sodium silicate having a viscosity of 220 centipoises has been found capable of withstanding normal working during the casting of diaphragm partition blades.

Although the protective coating of this invention preferably is applied to the metallic material in a dual application, the ingredients of each coat can be combined and applied in a single coating to protect against pitting. In a single coat application, the fusible materials must comprise at least 10% by weight of the solids forming the combined coating to effectively seal the protected alloy from oxygen and carbon bearing gases. Because the iron particles should not be ground as fine as the fusible materials, the iron should comprise at least 20% by weight of the solids forming the mixture to assure a good distribution of the iron particles along the surface of the alloy to react with any carbon materials piercing the sealants. An overall organic content of less than 5% is required of the protective coating to effectively inhibit carburization of the protected alloy.

Because the protective coating of this invention is subject to dissolution when being applied to a metal surface which is worked in a damp atmosphere, e.g. turbine blades in damp sand, a waterproofing coat such as 25% $SiO_2$ content hydrolyzed ethyl silicate solution is applied over the sealer coat to preserve the integrity of the protective coating. Similarly the protective coating can be waterproofed by setting the protective coating in a carbon dioxide gas atmosphere to precipitate silica gel from the sodium silicate. The silica gel then serves as an insoluble binder for the protective coating.

The protective coating also has been rendered relatively resistant to water by incorporating into the protective coating small quantities, e.g. less than 5% of the protective coating, of various carbonates, hydroxides, oxides or fluorides such as magnesium carbonate, zinc oxide, and sodium silico fluoride to react with the sodium silicate at low baking temperatures of 250° C. thereby forming less soluble compounds. When the protective coating is applied in a dual application (e.g. a base coat and a sealer coat), the carbonate, hydroxide, oxide or fluoride preferably is added only to the sealer coat and the coated alloy is heated at a temperature of approximately 100° C. for a period of about 1 hour or longer to form a relatively insoluble sealer coat. Although waterproofing of the protective coating is described as being accomplished by the addition of a carbonate, hydroxide, oxide or fluoride to the protective coating, in actual practice a mixture of the waterproofing additives often is more beneficially utilized to control the thickening effect of the slurry.

In the application of the dual layer protective coating, the clay, sodium silicate, water and flint of the base coat initially are ball milled for 15 minutes and subsequently the iron particles are stirred into the milled solution to complete the base coat. After a 3 mil thick base coat is applied to the cleaned surface of the alloy and partially dried, a suspension, formed by ball milling the sodium silicate, water, glasses and nepheline syenite of the sealer coat for 30 minutes, is air sprayed atop the base coat to form a 3 mil thick sealer coat. A waterproofing coat of synasol, 3% hydrochloric acid solution and ethyl silicate then is mixed and applied in a .1 to 1 mil layer over the sealer coat.

The base coat and the sealer coat are prepared for the single application protective coating in exactly the same manner as described for the dual coat application. However for the single application protective coating both coats are mixed together prior to spraying of the mixture upon the alloy surface. The waterproofing coat then is sprayed atop the protective coating after a drying of the protective coating.

The following specific composition has been found suitable to protect an alloy consisting of approximately 87% iron, 12% chromium and 1% other material against both oxidation and carburization at temperatures between 600° C. and 1300° C.

BASE COAT

| | |
|---|---|
| Sodium silicate (viscosity 1700) cc | 175 |
| Distilled water cc | 163 |
| Aluminum silicate (air floated Ky #4 Old Mine ball clay) grams | 33 |
| Supersil Flint do | 245 |
| Iron (200 mesh) do | 163 |
| Iron (100 mesh) do | 82 |

Ball mill sodium silicate, distilled water, aluminum silicate and supersil flint for 15 minutes and subsequently stir the iron into the mixture.

SEALER COAT

| | |
|---|---|
| Sodium silicate (viscosity 220) cc | 120 |
| Distilled water cc | 330 |
| Volcanic ash clay (Bentonite, #660 High Gel) grams | 30 |
| Glass (200 mesh, softening temp. 575° C.) do | 70 |
| Glass (200 mesh, softening temp. 800° C.) do | 70 |
| Nepheline Syenite (150–200 mesh, softening temperature 950° C.) grams | 70 |

Ball mill ingredients 30 minutes.

WATERPROOFING COAT

| | Cc. |
|---|---|
| Synasol | 339 |
| 3% HCl solution | 72 |
| Ethyl silicate (#40) | 589 |

Stir ingredients until clear. Use only when cooled to room temperature.

Although iron particles preferably are employed as the sacrificial metal particles of the protective coating of the example because of the relatively low cost of the iron particles and the large percentage of iron in the alloy being protected, particles of other materials, such as chromium, having a greater reactivity with carbon than iron can be substituted for the iron particles in the coating of the specific example.

While several examples of this invention have been shown and described, it will be apparent to those skilled in the art that many changes and modifications may be made without departing from this invention in its broader aspects; and therefore the appended claims are intended to cover all such changes and modifications as fall within the true spirit and scope of this invention.

What is claimed is:

1. A coated iron-chromium alloy surface subject to working at elevated temperatures between 600° C. and 1300° C., said alloy surface being coated by an aqueous suspension of a mixture comprising:
   (A) a plurality of diverse fusible materials cumulatively forming at least 10% by weight of said mixture,
       said fusible materials being characterized by differing softening temperatures between approximately 575° C. and 800° C. with at least two of said materials being glasses and at least one other of said fusible materials being a nepheline syenite mineral having a softening temperature in excess of the softening temperature of said glasses to soften during working thereby extending the effective temperature sealing range of the coating,
   (B) particles of a metal characterized by a reactivity with carbonaceous materials at least equal to the reactivity of said iron-chromium alloy with carbonaceous materials,
       said particles forming at least 20% by weight of said mixture and being of a metal nondeleterious to the characteristic properties of said iron-chromium alloy at temperatures above 600° C., said particles further being characterized by an average dimension between 100 and 200 mesh,
   (C) an inorganic bonding agent intermingled with said particles and said fusible materials to promote adhesion of said particles and said fusible materials to the alloy surface, and
   (D) a suspending agent for enhancing the suspension of said metal particles and said fusible materials within the water carrier forming the aqueous suspension, said inorganic bonding agent and said suspending agent together forming the balance of said mixture wherein said mixture has an overall organic content of less than 5%.

2. A coated iron-chromium alloy surface according to claim 1 further including a water proofing agent applied to said coating to render said coating resistant to dissolution in water.

3. A coated iron-chromium alloy surface according to claim 1 wherein said bonding agent is sodium silicate.

4. A coated iron-chromium alloy surface according to claim 1 wherein said metal particles are selected from the group consisting of iron, chromium, molybdenum, zirconium and titanium.

5. A coated iron-chromium alloy surface according to claim 4 wherein said inorganic bonding agent is sodium silicate and said suspending agent is aluminum silicate.

References Cited

UNITED STATES PATENTS

| 2,898,253 | 8/1959 | Schneider et al. | 117—23 X |
| 2,977,251 | 3/1961 | Long et al. | 117—129 X |
| 3,203,815 | 8/1965 | Michael | 117—129 X |
| 3,459,601 | 8/1969 | Mueller | 117—129 |

ALFRED L. LEAVITT, Primary Examiner

C. K. WEIFFENBACH, Assistant Examiner

U.S. Cl. X.R.

117—70 C, 70 S, 71 M, 127, 129